United States Patent
Albi et al.

(10) Patent No.: US 12,556,504 B2
(45) Date of Patent: Feb. 17, 2026

(54) SAVING CONTENT ITEMS IN CHAT SYSTEMS

(71) Applicant: Snap Inc., Santa Monica, CA (US)

(72) Inventors: Isabelle Albi, Los Angeles, CA (US); Nathan Kenneth Boyd, Los Angeles, CA (US); David Phillip Taitz, Los Angeles, CA (US); Jeremy Baker Voss, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/615,147

(22) Filed: Mar. 25, 2024

(65) Prior Publication Data

US 2025/0300954 A1  Sep. 25, 2025

(51) Int. Cl.
*G06F 15/16* (2006.01)
*H04L 51/04* (2022.01)
*H04L 51/216* (2022.01)

(52) U.S. Cl.
CPC ............ *H04L 51/216* (2022.05); *H04L 51/04* (2013.01)

(58) Field of Classification Search
CPC .............................. H04L 51/04; H04L 51/216
USPC ......................................................... 709/206
See application file for complete search history.

(56) References Cited

U.S. PATENT DOCUMENTS

| | | | |
|---|---|---|---|
| 10,764,221 B1 * | 9/2020 | Dalonzo ................. | H04L 51/52 |
| 11,962,555 B1 * | 4/2024 | Tewes ..................... | H04L 51/10 |
| 2002/0032742 A1 * | 3/2002 | Anderson ............. | H04L 51/224 |
| | | | 709/206 |
| 2022/0078148 A1 * | 3/2022 | Zhao ..................... | G06F 40/211 |

OTHER PUBLICATIONS

WhatsApp. "About kept messages". Mar. 11, 2023. p. 1. (Year: 2023).*
Tucker, Kevin. "Snapchat How to unsave messages". Jan. 23, 2021. pp. 1-2. (Year: 2021).*

* cited by examiner

*Primary Examiner* — Imad Hussain
(74) *Attorney, Agent, or Firm* — SCHWEGMAN LUNDBERG & WOESSNER, P.A.

(57) ABSTRACT

Users of a chat system within an interactive platform can suspend the expiration of a plurality of content items. Example methods include generating a chat, the chat comprising an association between a first user account and a second user account, and receiving, from a first user system associated with the first user account, an indication of a plurality of content items and an indication of the chat. The method may further include sending, to a second user account, the plurality of content items and an indication of the chat, and receiving, from the second user account, an indication to save the plurality of content items within the chat. The method may further include setting a saved data field associated with the plurality of content items and the second user account, the saved data field indicating the plurality of content items do not expire within the chat.

20 Claims, 16 Drawing Sheets

SAVING CONTENT ITEMS IN CHAT SYSTEMS

TECHNICAL FIELD

Examples of the present disclosure relate generally to saving content items of collections of content items, which may be termed stories, within a chat system of an interaction platform. More particularly, but not by way of limitation, examples of the present disclosure relate to suspending deletion of content items based on the content items being saved within the chat system.

BACKGROUND

Chat systems or applications within interaction platforms have become ubiquitous. And users increasingly want more and more functionality from the chat systems and for the functionality to be easier to use. But often it is difficult to add the functionality to make the functionality easy for the users to use.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Chat systems within interaction platforms have become ubiquitous and often users of the interaction platform would like to control how long posts to other users remain accessible within the chat system. A technical challenge is how to enable users of a chat system to control how long collections of content items or stories remain accessible within a chat system.

The technical challenge is addressed by enabling users to set a timer for how long a plurality of content items remains in the chat before expiring or being deleted from the chat. Users can suspend the expiration process by saving the plurality of content items in the chat or saving a content item of the plurality of content items in the chat. The users may each have the ability to save a plurality of content items so that either user can suspend the expiration of the plurality of content items. The owner or poster of the plurality of content items can delete the plurality of content items from their personal storage, which will cause the plurality of content items to be deleted from the chat. Additionally, users can unsave the plurality of content items.

Networked Computing Environment

Figure 1:
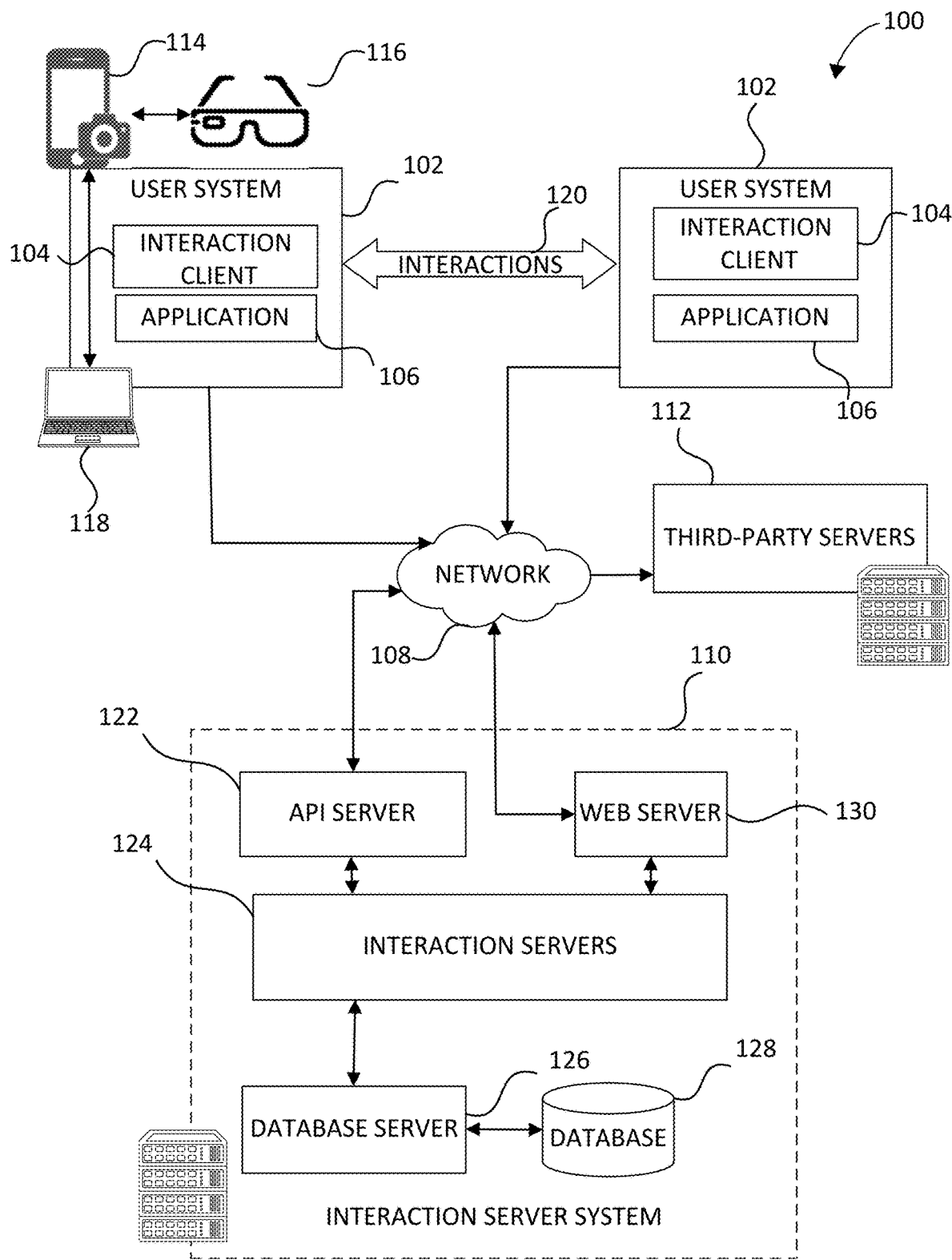
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple client systems, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems), an interaction server system 110 and third-party servers 112). An interaction client 104 can also communicate with locally hosted applications 106 using Applications Program Interfaces (APIs).

Each user system 102 may include multiple user devices, such as a computing device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104). The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
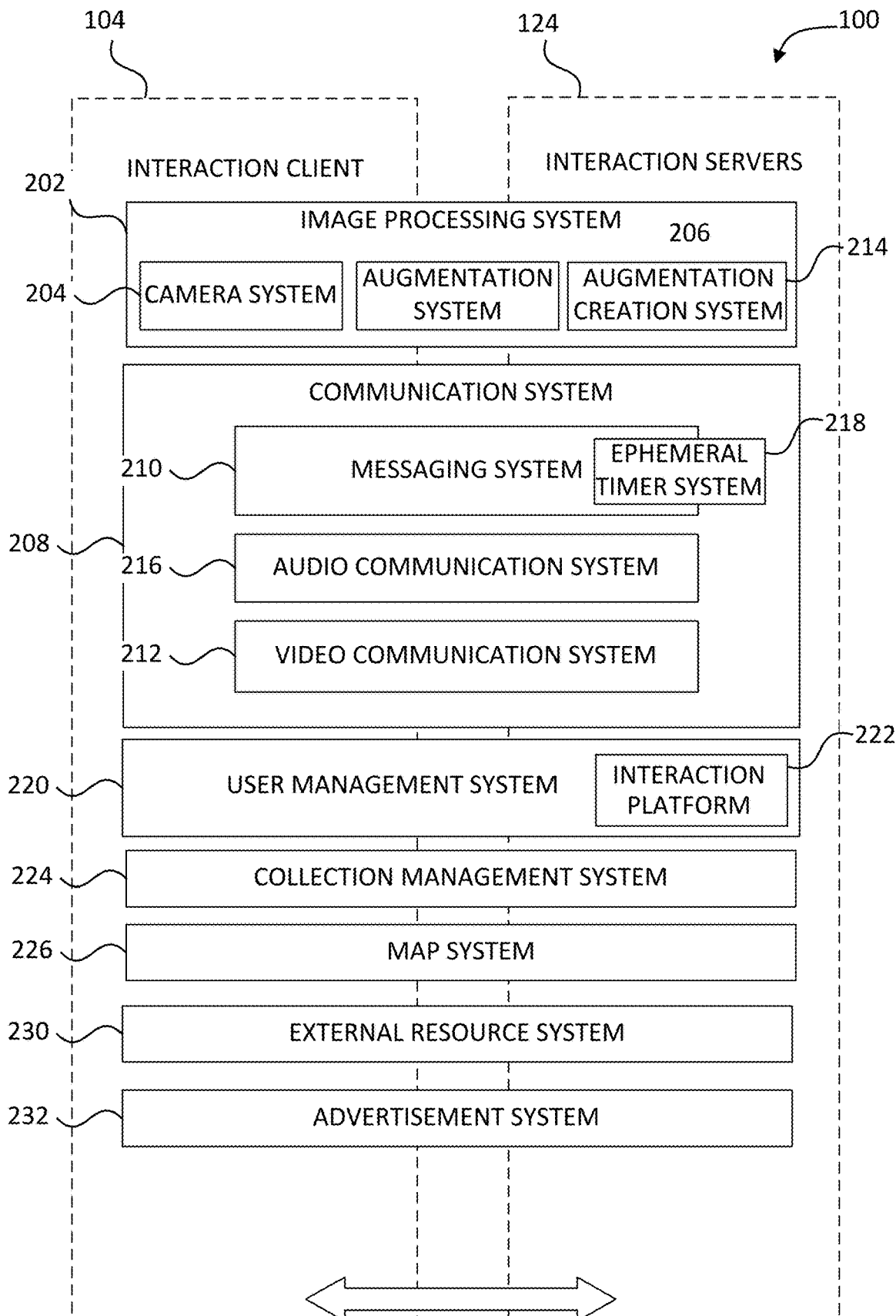
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 508 of a user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes an interaction platform that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
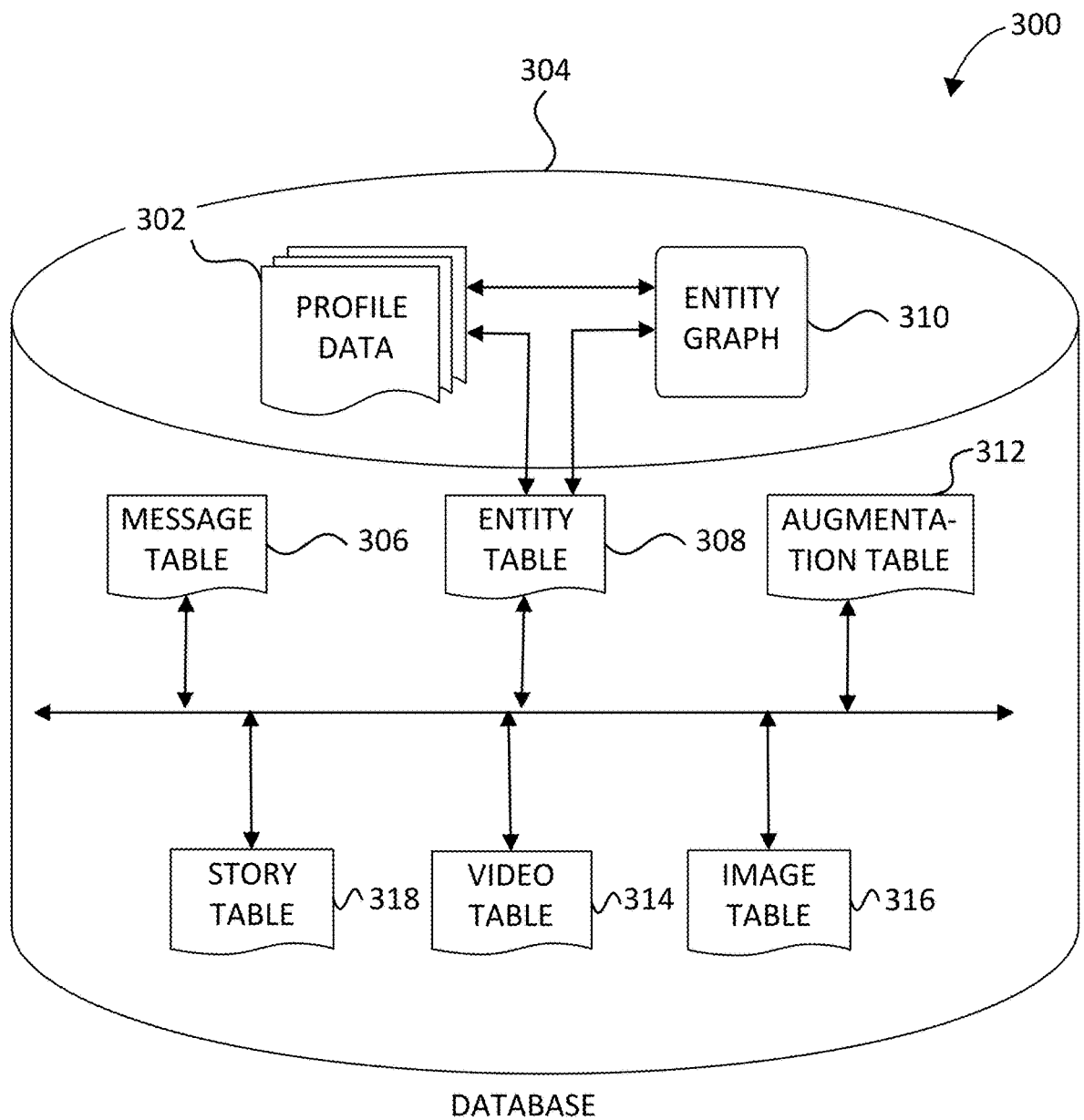
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Machine Architecture

Figure 4:
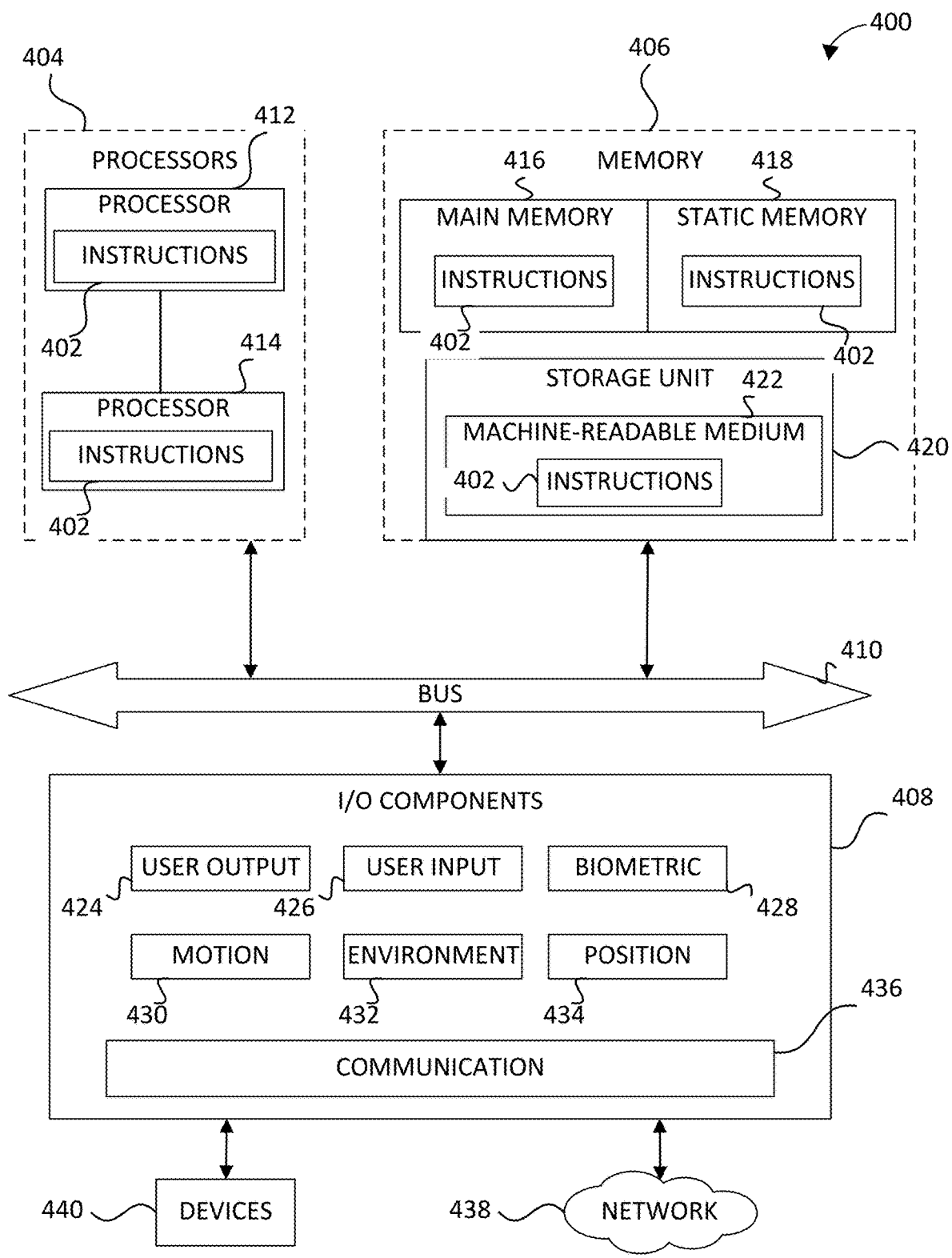
FIG. 4 is a diagrammatic representation of a machine in the form of a computer system within which a set of instructions may be executed to cause the machine to perform any one or more of the methodologies discussed herein, according to some examples.

FIG. 4 is a diagrammatic representation of the machine 400 within which instructions 402 (e.g., software, a program, an application, an applet, an app, or other executable code) for causing the machine 400 to perform any one or more of the methodologies discussed herein may be executed. For example, the instructions 402 may cause the machine 400 to execute any one or more of the methods described herein. The instructions 402 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 402, sequentially or otherwise, that specify actions to be taken by the machine 400. Further, while a single machine 400 is illustrated, the term "machine" shall also be taken to include a collection of machines that individually or jointly execute the instructions 402 to perform any one or more of the methodologies discussed herein. The machine 400, for example, may comprise the user system 102 or any one of multiple server devices forming part of the interaction server system 110. In some examples, the machine 400 may also comprise both client and server systems, with certain operations of a particular method or algorithm being performed on the server-side and with certain operations of the particular method or algorithm being performed on the client-side.

The machine 400 may include processors 404, memory 406, and input/output I/O components 408, which may be configured to communicate with each other via a bus 410. In an example, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 412 and a processor 414 that execute the instructions 402. The term "processor" is intended to include multi-core processors that may comprise two or more independent processors (sometimes referred to as "cores") that may execute instructions contemporaneously. Although FIG. 4 shows multiple processors 404, the machine 400 may include a single processor with a single-core, a single processor with multiple cores (e.g., a multi-core processor), multiple processors with a single core, multiple processors with multiples cores, or any combination thereof.

The memory 406 includes a main memory 416, a static memory 418, and a storage unit 420, both accessible to the processors 404 via the bus 410. The main memory 406, the static memory 418, and storage unit 420 store the instructions 402 embodying any one or more of the methodologies or functions described herein. The instructions 402 may also reside, completely or partially, within the main memory 416, within the static memory 418, within machine-readable medium 422 within the storage unit 420, within at least one of the processors 404 (e.g., within the processor's cache memory), or any suitable combination thereof, during execution thereof by the machine 400.

The I/O components 408 may include a wide variety of components to receive input, provide output, produce output, transmit information, exchange information, capture measurements, and so on. The specific I/O components 408 that are included in a particular machine will depend on the type of machine. For example, portable machines such as mobile phones may include a touch input device or other such input mechanisms, while a headless server machine will likely not include such a touch input device. It will be appreciated that the I/O components 408 may include many other components that are not shown in FIG. 4. In various examples, the I/O components 408 may include user output components 424 and user input components 426. The user output components 424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 408 may include biometric components 428, motion components 430, environmental components 432, or position components 434, among a wide array of other components. For example, the biometric components 428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 430 include acceleration sensor components (e.g., accelerometer), gravitation sensor components, rotation sensor components (e.g., gyroscope).

The environmental components 432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 408 further include communication components 436 operable to couple the machine 400 to a network 438 or devices 440 via respective coupling or connections. For example, the communication components 436 may include a network interface component or another suitable device to interface with the network 438. In further examples, the communication components 436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 440 may be another machine or any of a wide variety of peripheral devices (e.g., a peripheral device coupled via a USB).

Moreover, the communication components 436 may detect identifiers or include components operable to detect identifiers. For example, the communication components 436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 436, such as location via Internet Protocol (IP) geolocation, location via Wi-Fi® signal triangulation, location via detecting an NFC beacon signal that may indicate a particular location, and so forth.

The various memories (e.g., main memory 416, static memory 418, and memory of the processors 404) and storage unit 420 may store one or more sets of instructions and data structures (e.g., software) embodying or used by any one or more of the methodologies or functions described herein. These instructions (e.g., the instructions 402), when executed by processors 404, cause various operations to implement the disclosed examples.

The instructions 402 may be transmitted or received over the network 438, using a transmission medium, via a network interface device (e.g., a network interface component included in the communication components 436) and using any one of several well-known transfer protocols (e.g., hypertext transfer protocol (HTTP)). Similarly, the instructions 402 may be transmitted or received using a transmission medium via a coupling (e.g., a peer-to-peer coupling) to the devices 440.

Software Architecture

Figure 5:
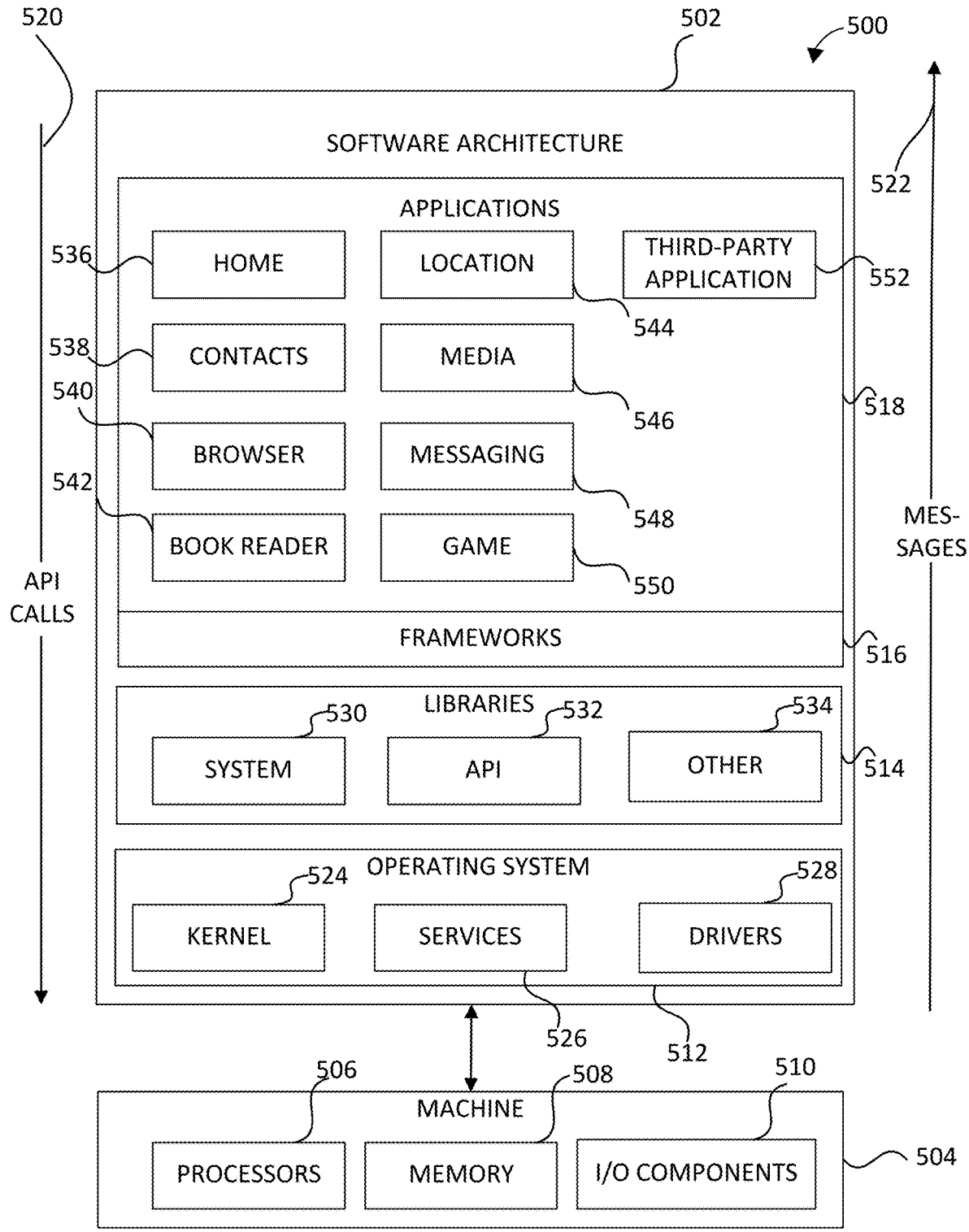
FIG. 5 is a block diagram showing a software architecture within which examples may be implemented.

FIG. 5 is a block diagram 500 illustrating a software architecture 502, which can be installed on any one or more of the devices described herein. The software architecture 502 is supported by hardware such as a machine 504 that includes processors 506, memory 508, and I/O components 510. In this example, the software architecture 502 can be conceptualized as a stack of layers, where each layer provides a particular functionality. The software architecture 502 includes layers such as an operating system 512, libraries 514, frameworks 516, and applications 518. Operationally, the applications 518 invoke API calls 520 through the software stack and receive messages 522 in response to the API calls 520.

The operating system 512 manages hardware resources and provides common services. The operating system 512 includes, for example, a kernel 524, services 526, and drivers 528. The kernel 524 acts as an abstraction layer between the hardware and the other software layers. For example, the kernel 524 provides memory management, processor management (e.g., scheduling), component management, networking, and security settings, among other functionalities. The services 526 can provide other common services for the other software layers. The drivers 528 are responsible for controlling or interfacing with the underlying hardware. For instance, the drivers 528 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 514 provide a common low-level infrastructure used by the applications 518. The libraries 514 can include system libraries 530 (e.g., C standard library) that provide functions such as memory allocation functions, string manipulation functions, mathematic functions, and the like. In addition, the libraries 514 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 514 can also include a wide variety of other libraries 534 to provide many other APIs to the applications 518.

The frameworks 516 provide a common high-level infrastructure that is used by the applications 518. For example, the frameworks 516 provide various graphical user interface (GUI) functions, high-level resource management, and high-level location services. The frameworks 516 can provide a broad spectrum of other APIs that can be used by the applications 518, some of which may be specific to a particular operating system or platform.

In an example, the applications 518 may include a home application 536, a contacts application 538, a browser application 540, a book reader application 542, a location application 544, a media application 546, a messaging application 548, a game application 550, and a broad assortment of other applications such as a third-party application 552. The applications 518 are programs that execute functions defined in the programs. Various programming languages can be employed to create one or more of the applications 518, structured in a variety of manners, such as object-oriented programming languages (e.g., Objective-C, Java, or C++) or procedural programming languages (e.g., C or assembly language). In a specific example, the third-party application 552 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 552 can invoke the API calls 520 provided by the operating system 512 to facilitate functionalities described herein.

Saving Content Items in Chat Systems

Figure 6:
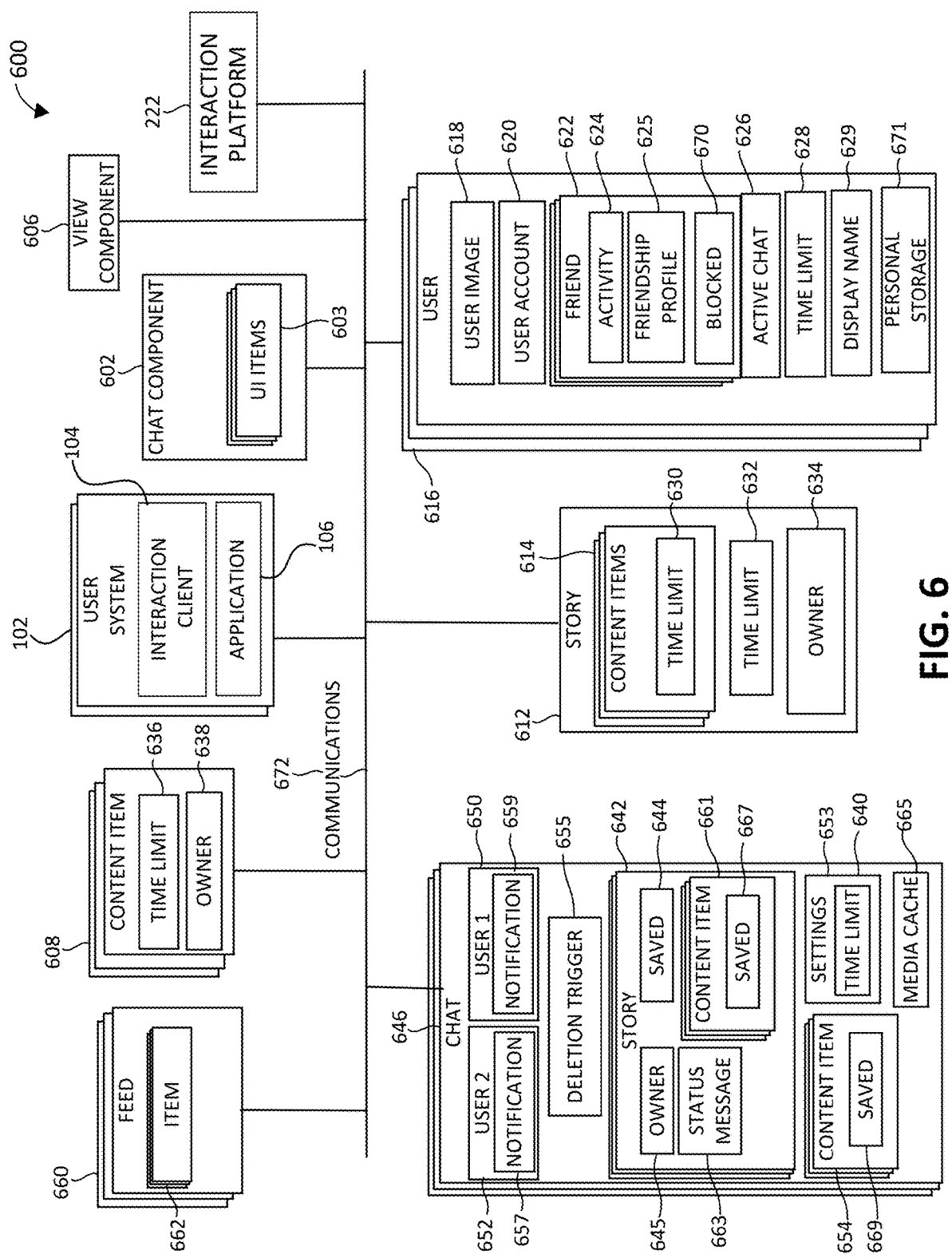
FIG. 6 illustrates a system for saving content items in chat systems, in accordance with some examples.

FIG. 6 illustrates a system 600 for saving content items in chat systems, in accordance with some examples. The chat component 602 enables users 616 to chat interactively within a chat 646. The chat component 602 is part of the communication system 208 of FIG. 2, the interaction client 104, and/or the application 106. The user interface (UI) items 603 are user interface items that when selected by a user 616 cause an action to be performed by the chat component 602. A UI item 603 may be an icon, a voice command, a short press on the screen, a long press on the screen, a hand gesture, and so forth. The view component 606 is part of the collection management system 224, the interaction client 104, and/or the application 106, and enables users 616 to view data associated with the interaction platform 222. The user system 102 is discussed in conjunction with FIG. 1. The components communicate with one another via communications 672 as disclosed in conjunction with FIGS. 1 and 2 and herein.

A user 616 uses a user system 102 to use the interaction platform 222 discussed in conjunction with FIG. 2. The users 616 are members of the interaction platform 222. The users 616, story 612, feed 660, content items 608, and chats 646 are managed by the collection management system 224, the chat component 602, and the view component 606.

The user 616 includes a user image 618, which is an image or icon of the user 616. The user account 620 indicates an account name used to logon to the interaction platform 222. Friends 622 are connected or linked to the user 616 within the interaction platform 222 and are other users 616 of the interaction platform 222. The activity 624 is activity between the friend 622 and the user 616, which may be encrypted and/or stored disassociated from the user 616 and the friend 622. The active chat 626 is data associated with current or active chats 646.

The time limit 628 is a time limit the user 616 sets for how long a content item 608 or story 612 remains in the chat 646 after it has been posted to the chat 646 before it is deleted. Example time limits 628 include 10 seconds, one hour, one day, or infinity, which indicates that story 612 or content item 608 is not to be deleted based on how long it has been in the chat 646. The time limit 628 may indicate a value between 1 second and infinity, in accordance with some embodiments. The time limit 628 is an example of a deletion trigger 655, which determines conditions for when to delete a story 642 or content item 654 from the chat 646. The display name 629 is a name the chat component 602 may use to identify the user 616.

The story 612 is a collection of content items 614. The content items 614 may have individual time limits 630. The story 612 may have an individual time limit 632. The time limit 630 of the content items 614 and the time limit 632 of the story 612 may be based on the time limit 628 of the user 616. Example content items 608 include images, text, video, augmented reality (AR) items, mixed reality (MR) items, virtual reality (VR) items, or extended reality (XR) items.

The time limit 636 of the content item 608 indicates a time limit 636 to use for the content item 608. The owner 638 is a user 616 who has the permissions or rights to copy, delete, generate, and so forth, the content item 608. The feed 660 is items 662 that are displayed to the user 616 by the chat component 602. The feed 660 includes active chats 646 of which the user 616 is part. The chat component 602 displays the feed 660 to the user to provide the user 616 with the opportunity to select an item 662.

The chat 646 is data representing a chat 646 between user 1 650 and user 2 652. User 1 650 and user 2 652 are users 616. In some examples, there may be additional users 616 participating in the chat 646. Content item 654 is a content item 608 and may have a time limit 636 associated with it. The content item 654 may have a saved 669 data field associated with it to indicate whether the content item 654 has been saved in the chat 646. The saved 669 data field may indicate whether user 1 650 or user 2 652 saved the content item 654. The settings 653 are parameters for the chat 646. The time limit 640 is a duration associated with the chat 646 as a default duration for content items 654 or a story 642 to be deleted after it is posted to the chat 646. The time limit 640 is used to determine a deletion trigger 655.

The chat component 602 determines a deletion trigger 655 for how long a content item 654 or story 642 should remain in the chat 646 before being deleted or expiring. The deletion trigger 655 is determined based on the time limit 640, time limit 628, time limit 632, and time limit 636. A time associated with posting the content item 654 or a story 642 is compared with a current time. If more than a threshold period of time has passed or a threshold duration has been transgressed, then the content item 654 or a story 642 is deleted. There may be additional conditions or deletion triggers 655 that need to be met before the content item 654 or a story 642 is deleted.

Deletion trigger 655 is a condition for deleting content items 654 and/or a story 642. For example, a deletion trigger 655 may be to delete the content item 654 and/or a story 642 after it has been read. The deletion trigger 655 may have logic as part of the deletion trigger 655 and there may be more than one deletion trigger 655. For example, if the time limit 640 is set to five minutes, a first deletion trigger 655 is to delete the story 642 or content item 654 after it has been read, and another deletion trigger 655 is to delete the story 642 or content item 654 if the user 616 who did not post the content item 654 or story 642 becomes inactive within the chat 646. For example, the chat component 602 may determine a user 1 650 is inactive if they close the application 106. The user 616 may set multiple deletion triggers 655 based on a condition such as a duration since the story 642 or content item 654 was sent or read or another condition.

The story 642 is a story 612. Saved 644 indicates whether the story 642 has been saved to the chat 646 and indicates whether user 1 650 or user 2 652 saved the story 642. The owner 645 indicates user 1 650 or user 2 652 as the owner of the story 642. The media cache 665 is a storage area for a story 642 and/or content items 654 to be stored and may be viewable by user 1 650 or user 2 652.

In some examples, a selection of a story 642, such as with a long press, within the chat 646 causes the chat component 602 to display UI items 603. The UI items 603 include "Save to Chat", which causes the chat component 602 to save the story 642 within the chat 646 when selected and set saved 644 to indicate the story 642 is saved. In some examples, the chat component 602 only displays the "Save to Chat" UI item 603 if the time limit 640 of the settings 653 is set to a particular value such as infinite or another value. In some examples, the chat component 602 only displays the "Save to Chat" if user 1 650 and user 2 652 are friends 622 within the interaction platform 222 of FIG. 2. In some examples, the chat component 602 determines whether to offer the "Save to Chat" UI item 603 based on a number of users 616 in the chat 646. For example, the chat component 602 determines to offer the "Save to Chat" UI item 603 only if there are two users 616 within the chat 646.

The chat component 602 displays a "Save to Chat" UI item 603 after determining that the conditions to offer the "Save to Chat" UI item 603 are met. A selection of the "Save to Chat" UI item 603 causes the chat component 602 to save the story 642 to the chat 646. In some examples, the chat component 602 may show an animation or indication that the story 642 has been saved to the chat 646. Additionally, the chat component 602 may alter the display of the story 642 to indicate that the story 642 has been saved to the chat 646. The story 642 is a copy of or an indication of a story 612 posted to the chat 646 by user 1 650 or user 2 652.

In some examples, the chat component 602 does not send a notification to the other user such as user 2 652 that user 1 650 saved the story 642 in the chat 646. In some examples, the chat component 602 sends a notification to the other user 616 such as user 2 652 that the story 642 was saved in the chat 646 by user 1 650. For examples, an indication is sent to the story 642 poster, user 1 650, if user 2 652 has saved the posted story 642. The notification may be "[display name 629 of user 2 652] Saved your Story".

In some examples, the chat component 602 will modify an item 662 corresponding to the chat 646 where the story 642 was just saved with an indication that the story 642 was just saved. For example, adding "Story Saved in Chat" to the item 662 corresponding to the chat 646. In some examples, the chat component 602 will change a feed ranking to make the chat 646 where the story 642 was just saved as a first item 662 such as displayed first in a list on a screen.

In some examples, a saved story 642 will be displayed within the chat 646 with a status message that indicates the story 642 is saved 644 and may indicate an owner 645 of the story 642. In some examples, the indication that the story 642 is saved 644 is "You saved a story from [display name 629 of user 616]".

Additionally, a user 1 650 may save a content item 614 such as an image from the story 642. For example, the chat component 602 provides a user interface that enables the user 616 to scroll through the content items 614, of a story 642, such as videos or images. The user 616 may select a content item 614 with a long press of the content item 614 or in another way. The chat component 602 then offers the user 616 a UI items 603 indicating that the user 616 may save the individual content item 614 or the entire story 642.

In some examples, the chat component 602 saves the saved story 642 or the saved content item 614 from a story 642 in the friendship profile 625 of a friend 622 with whom the user 616 has a chat 646 with the user 616 being user 1 650 and the friend 622 being user 2 652.

A saved content item 608 of a story 642 or a saved story 642 is retained in the chat 646 in accordance with the settings 653. For example, the setting 653 may indicate that a saved story 642 or content item 654 of a story 642 are to remain in the chat 646 until "unsaved" or "deleted". In some examples, if the content item 654 of a story 642 or a story 642 is "unsaved", then the content item 654 or story 642 remain in the chat 646 in accordance with the settings 653. For example, the content item 654 or story 642 may remain until they have been viewed or until a period of time has elapsed such as 24 hours. In some examples, the chat component 602 does not notify the other user 616 when a user 616 performs an operation on the story 642 or content item 654 of a story 642. For example, if user 1 650 posted the story 642 to the chat 646 and user 2 652 "saves" a story 642 to the chat 646, then the chat component 602 does not notify user 1 650 if user 2 652 "saves" the story 642 to the chat 646.

The chat component 602 permits both user 1 650 and user 2 652 to "unsave" a "saved" content item 614 of a story 642 or a "saved" story 642, in accordance with some examples. The chat component 602 permits both user 1 650 and user 2 652 to "delete" a "saved" content item 614 of a story 642 or a "saved" story 642, in accordance with some examples. The chat component 602 permits both user 1 650 and user 2 652 to reply or react to a "saved" content item 614 of a story 642 or a "saved" story 642, in accordance with some examples.

The chat component 602 only permits the user 616 who "saved" the story 642 or content item 614 of a story 642 to "unsave" the story 642 or content item 614 of a story 642, in accordance with some examples.

If user 1 650 "saves" the story 642 or a content item 614 of a story 642 and user 2 652 "saves" the story 642 or a content item 614 of a story 642, then the chat component 602 only places the story 642 or a content item 614 of a story 642, as "unsaved" if both user 1 650 and user 2 652 "unsave" the story 642 or a content item 614 of a story 642, in accordance with some examples.

The chat component 602 permits either user 1 650 or user 2 652 to "delete" within the chat 646 the story 642 or a content item 614 of a story 642 even if the story 642 or a content item 614 of a story 642 is "saved", in accordance with some examples. The chat component 602 permits the poster or owner 634 of the story 642 or a content item 614 of a story 642 to "delete" the original story 612 or a content item 614 of the original story 612, in accordance with some examples. The chat component 602 permits either user 1 650 or user 2 652 to "save'" and "unsave" the story 642 or a content item 614 of the story 642 repeatedly, in accordance with some examples.

In some examples, when a story 642 or a content item 661 of a story 642 is "saved", then the time limit 640 until it is deleted or retention time becomes infinite to indicate it must be deleted to be removed from the chat 646. In some examples, when a story 642 is deleted because its time limit 640 expired or it is deleted by the poster, then "saved" content item 661 of the story 642 remain in the chat 646 until being "unsaved" or "deleted."

Saved content items 661 and a saved story 642 are stored in the media cache 665, which may be accessed by user 1 650 or user 2 652. In some examples, a bitmoji of the poster of the story 642 or the content item 661 of the story 642 is displayed with the content item 661 or the story 642 when displayed as part of the media cache 665. The poster of the story 642 or the content item 661 of the story 642 is considered the owner within the chat 646, media cache 665, and friendship profile 625, in accordance with some examples. In some examples, either user 1 650 or user 2 652 can delete content items 661 of a story 642 or a story 642 from one or more of: the media cache 665, chat 646, and/or friendship profile 625, in accordance with some examples.

If user 1 650 saves a story 642 or a content item 661 of a story 642, and then blocks them so blocked 670 is set, then user 1 650 cannot interact with the chat 646. If user 1 650 saves a story 642 or a content item 661 of a story 642, and then user 2 652 blocks user 1 650, user 1 650 still has access to the chat 646 and can still delete content items 661 or a story 642 saved to the chat 646. User 2 652 will not be able to see the chat 646. The chat component 602 maintains the chat 646 so user 1 650 and user 2 652 can unblock and re-friend one another and the saved content items 661 and story 642 will be accessible again.

The chat component 602 notifies the user 616 that a time limit 632 for a story 612 or for a content item 614 of a story 612 set to infinity or a value indicating not to delete the story 612 or the content item 614 based on a time limit permits other users 616 to save content items 661 or a story 642 posted to a chat 646 by the user 616.

The chat component 602 does not generate or generates a notification 657, 659 or a status message 663 when user 1 650 or user 2 652 "unsaves" a story 642 or a content item 661, in accordance with some examples. When the story 642 or content item 661 is "deleted" by user 1 650 or user 2 652, then the chat component 602 deletes the story 642 or the content item 661 from the media cache 665, in accordance with some examples.

In some examples, a notification 657 is sent to user 2 652 (or user 1 650) if user 1 650 (or user 2 652) saves a story 642 or a content item 661 of a story 642. The notification 657 may be a sound, text, or another notification 657 sent to the application 106.

Figure 7:
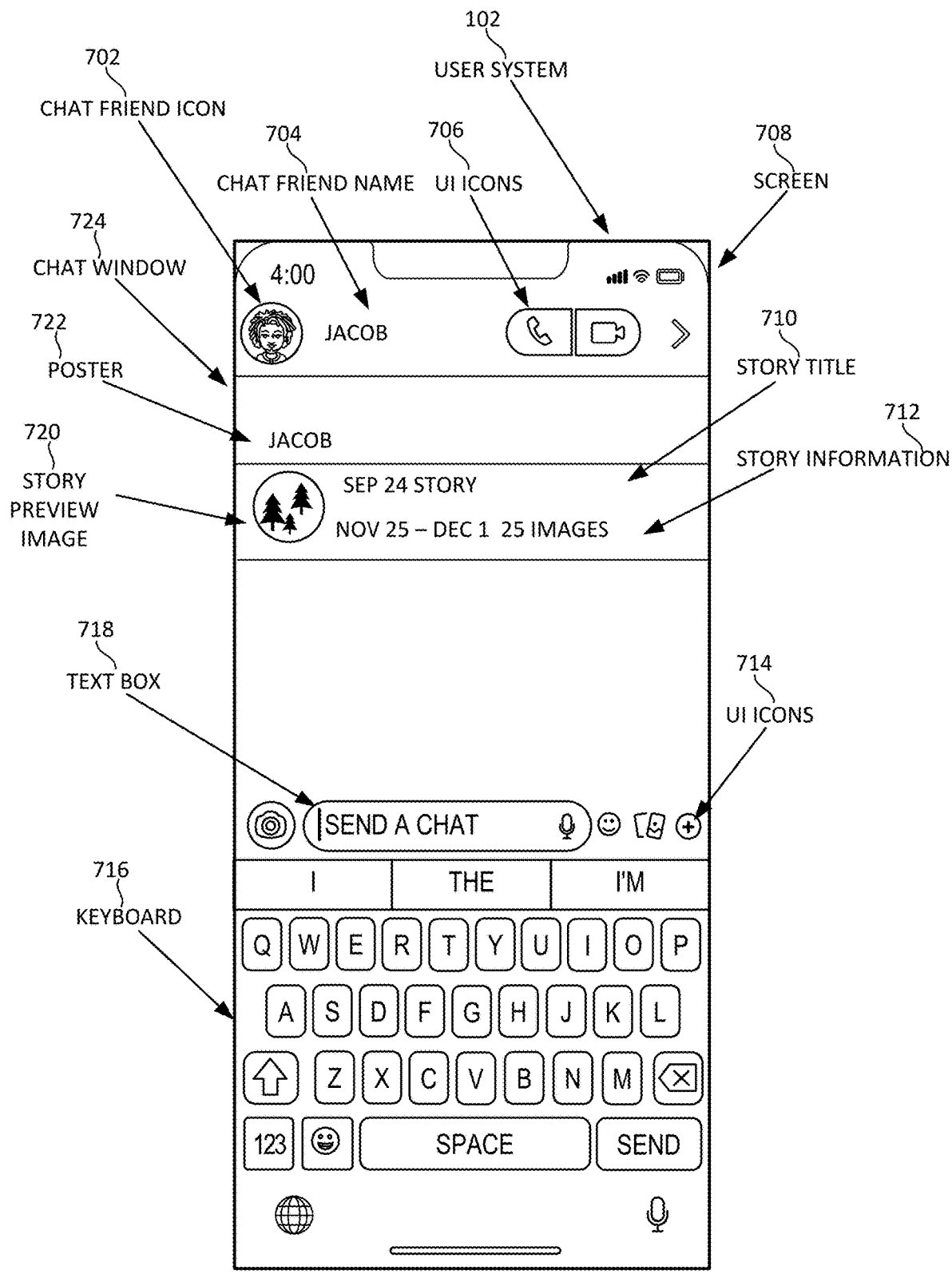
FIG. 7 illustrates a chat window with a story posted to the chat, in accordance with some examples.

FIG. 7 illustrates a chat window 724 with a story 642 posted to the chat 646, in accordance with some examples. User 1 650 and user 2 652 have a chat 646 with one another. The user system 102 is the user system 102 of user 1 650. The screen 708 is an electronic display of the user system 102, which may be an XR screen 708. The UI icons 706 offer user 1 650 access to other functions such as calling user 2 652, setting up a video chat with user 2 652, and so forth.

The chat component 602 displays chat friend icon 702 of user 2 652 for the chat window 724 of user 1 650. The chat friend icon 702 is the user image 618 of user 2 652. The chat friend name 704 is the display name 629 of user 2 652. User 2 652 posted a story 642 to the chat 646. The poster 722 is user 2 652, "Jacob". The story title 710 is "Sep 24 Story." The story information 712 indicates a number of content item 661, which here is "Nov 25-Dec 1 25 images." The story preview image 720 provides a preview image taken from one of the content items 661 of the story 642.

The chat component 602 displays a text box 718 and keyboard 716 for user 1 650 to post to the chat 646. The UI icons 714 provide access to additional functions for user 1 650 such as access to personal storage 671, friendship profile 625, and so forth. The chat component 602 enables user 1 650 to select items within the chat 646 by, for example, long presses.

Figure 8:
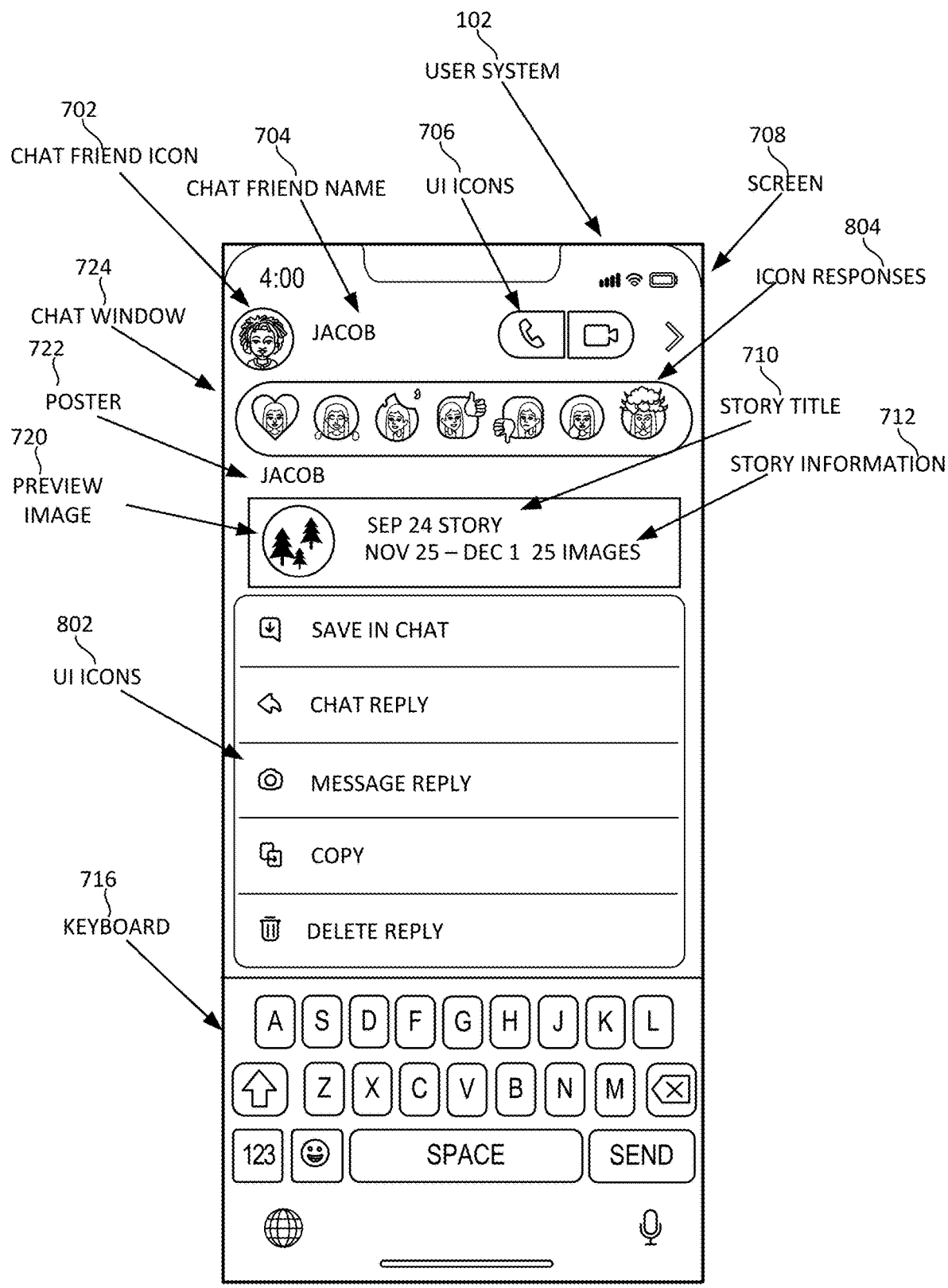
FIG. 8 illustrates the chat window of FIG. 7 after user 1 selects the story, in accordance with some examples.

FIG. 8 illustrates the chat window 724 of FIG. 7 after user 1 650 selects the story 642, in accordance with some examples. User 1 650 has selected the story 642 and the chat component 602 responds by displaying UI icons 802 and icon responses 804. User 1 650 can select an icon of the icon response 804 to respond to the story 642. Additionally, the user 1 650 can select one of the UI icons 802 to "save to chat," "chat reply," "message reply,", "copy," or "delete reply." The chat component 602 responds to a selection of a UI icon 802 and performs a function in accordance with the selected UI icon 802. The "copy" provides a copy of the story 642 in a cache for another function. The "message reply" enables user 1 650 to reply to user 2 652 outside of the chat 646 within the interaction platform 222 where the replay may be an ephemeral message managed by the messaging system 210 of FIG. 2.

Figure 9:
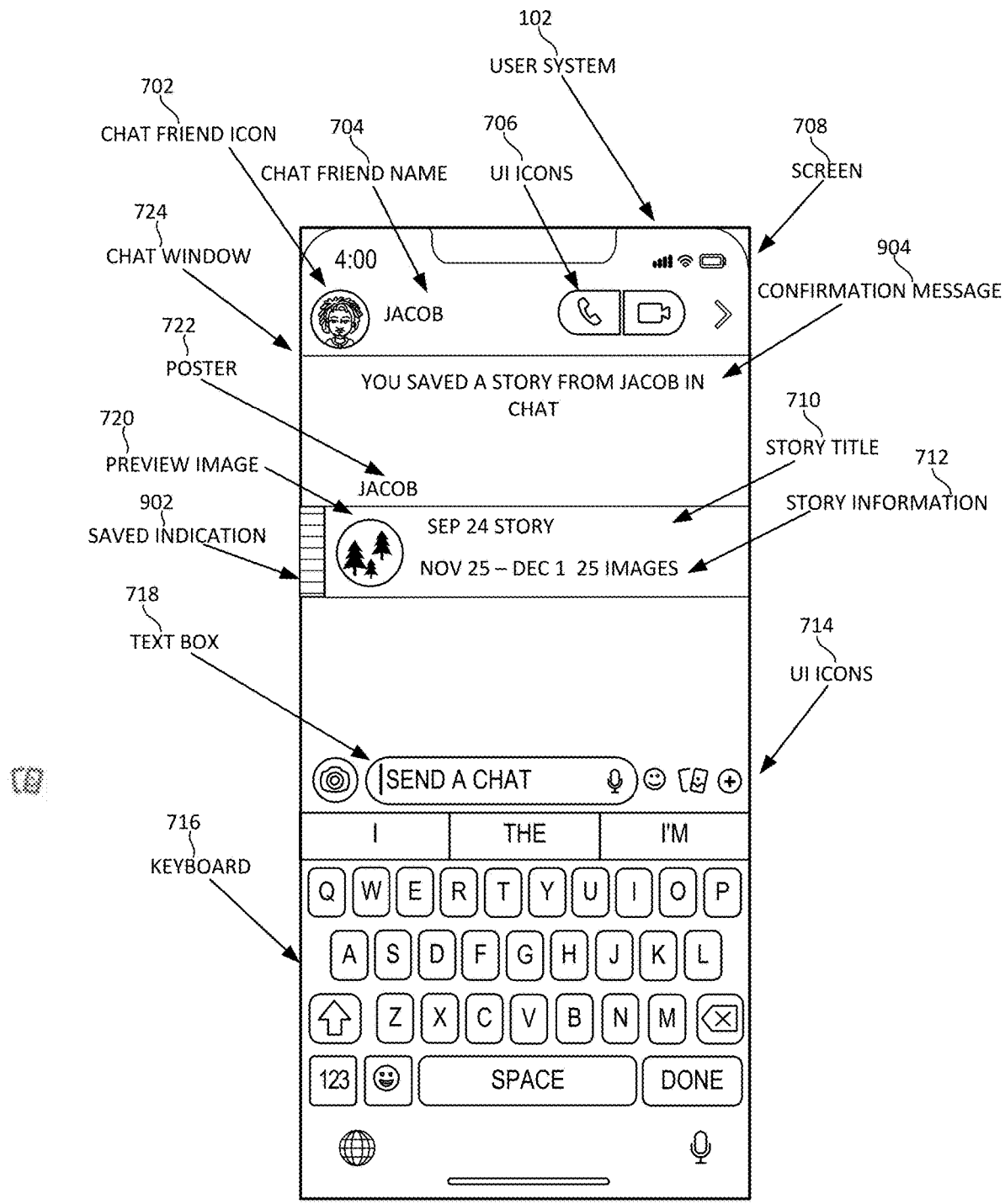
FIG. 9 illustrates the chat window of FIG. 8 after user 1 selects save story, in accordance with some examples.

FIG. 9 illustrates the chat window 724 of FIG. 8 after user 1 650 selects save story, in accordance with some examples. The chat component 602 set saved 644 to indicate the story 642 is saved to the chat 646 so that the time limit 640 will no longer be applied. Additionally, the story 642 will be saved to the friendship profile 625 of user 2 652 for user 1 650. The story 642 will also be saved in the media cache 665. The chat component 602 displays a confirmation message 904 such as "You saved a story from Jacob in Chat." The confirmation message 904 may be temporary and may include animations. The chat component 602 changes the display of the story 642 with the saved indication 902 so user 1 650 can discern that the story 642 has been saved.

Figure 10:
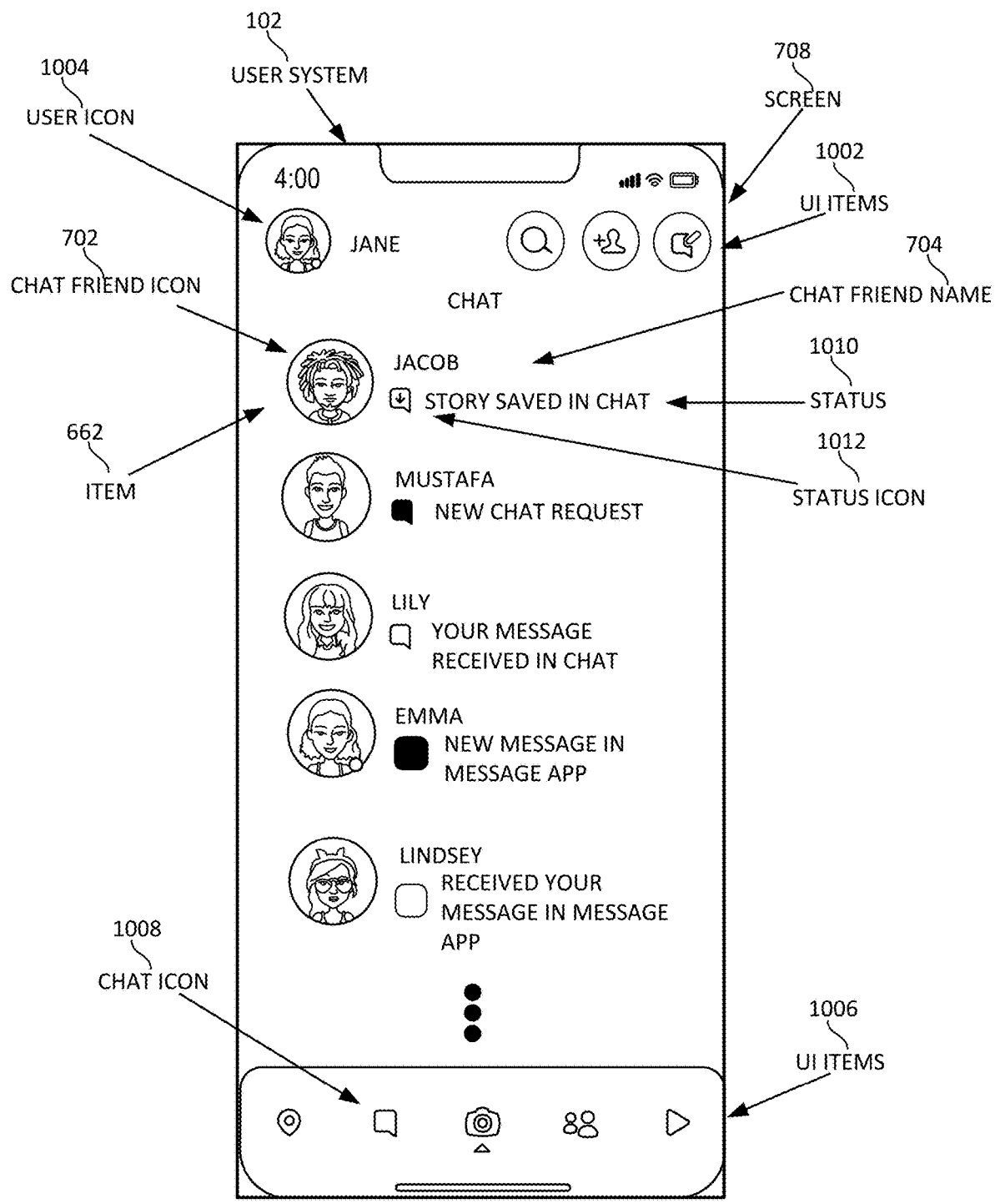
FIG. 10 illustrates an updated active chat list after the story of FIG. 9 has been saved, in accordance with some examples.

FIG. 10 illustrates an updated active chat list after the story 642 of FIG. 9 has been saved, in accordance with some examples. The user 1 650 selects the chat icon 1008, which causes the chat component 602 to display the feed 660. The chat 646 where the story 642 was just saved is an item 662 of the feed 660 and is moved to the top of the screen 708. Additionally, the chat component 602 displays a status 1010 "Story saved in chat" to indicate that the story 642 has been saved in the chat 646. The status icon 1012 indicates that the story 642 has been saved. The chat friend icon 702 and chat friend name 704 identify the chat 646.

Here there are five items 662 displayed. The items 662 are different chats 646 associated with the user 616. The user icon 1004 displays the user image 618 of the user 616 such as user 1 650. The UI items 1002 provide access to actions to the user 616. The screen 708 may have been displayed by the chat component 602 in response to the user 616 selecting the chat icon 1008 of the UI items 1006.

Figure 11:
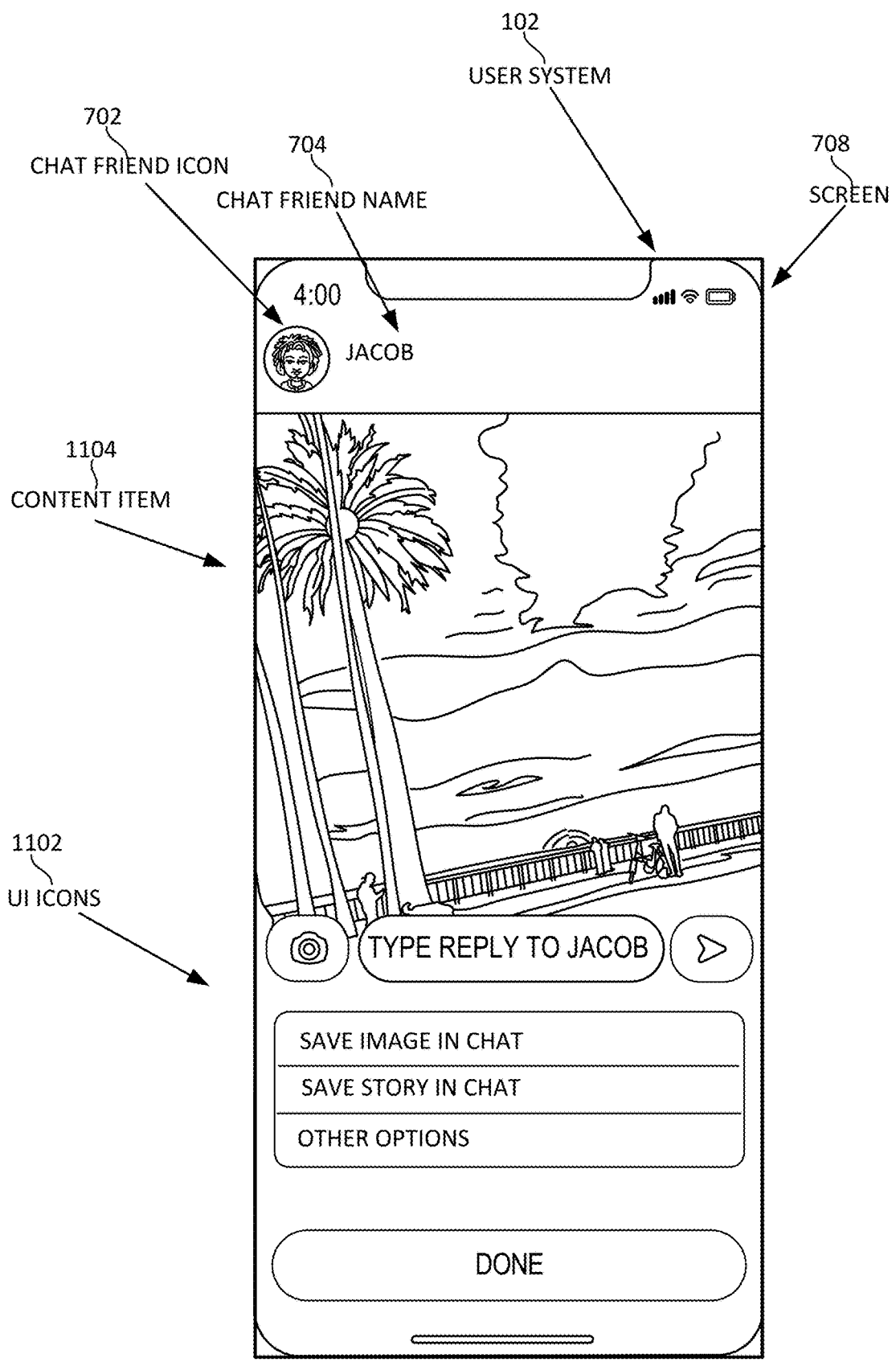
FIG. 11 illustrates saving content items in chats, in accordance with some examples.

FIG. 11 illustrates saving content items in chats, in accordance with some examples. FIG. 11 illustrates a user such as user 1 650 viewing a content item 1104 of a story 642 posted to a chat 646 by user 2 652, which has a chat friend name 704 of "Jacob". The story 642 has multiple content items 661 and user 1 650 may scroll through the content item 661 by, for example, swiping left or right.

The chat component 602 responds to a selection by user 1 650 of the content item 661 of the story 642 by displaying UI icons 1102. The selection by user 1 650 may be a long press on the screen 708 of the user system 102. The chat component 602 determines whether conditions are met that would enable user 1 650 to save the content item 661 or the story 642 to the chat 646. For example, the chat component 602 determines whether the time limit 640 for the content item 661 meets a condition to make it eligible for saving. For example, the chat component 602 may determine that the time limit 640 for a deletion trigger 655 is infinite, which indicates not to delete the content item 661 based on a duration of time that has pasted since posting the content item 667. Additionally, the chat component 602, in accordance with some embodiments, determines whether user 1 650 and user 2 652 are friends 622 and whether the chat 646 is for only user 1 650 and user 2 652. If the conditions are met, then the chat component 602 displays "Save Image in Chat" and "Save Story in Chat" as part of the UI icons 1102, which enables the user 1 650 to save the content item 661 or the story 642 to the chat 646. If the user 1 650 selects "Save Image in Chat", then the chat component 602 sets saved 667 to indicate the content item 661 is saved, saves the content item 661 in the friendship profile 625, and, in some embodiments, displays an indication at the top of the screen 708 that the content item 661 was saved. For example, the chat component 602 may display "Image Saved in Chat!" at a top of the screen 708. The term "image" is used as the chat component 602 may determine the type of content of the content item 661 and use a term such as video, image, or another term to describe the content item 661. If the user 1 650 selects "Save Story in Chat", then the chat component 602 sets saved 644 to indicate the story 642 is saved, saves the story 642 in the friendship profile 625, and, in some embodiments, displays an indication at the top of the screen 708 that the story 642 was saved. For example, the chat component 602 may display "Story Saved in Chat!" at a top of the screen 708.

Figure 12:
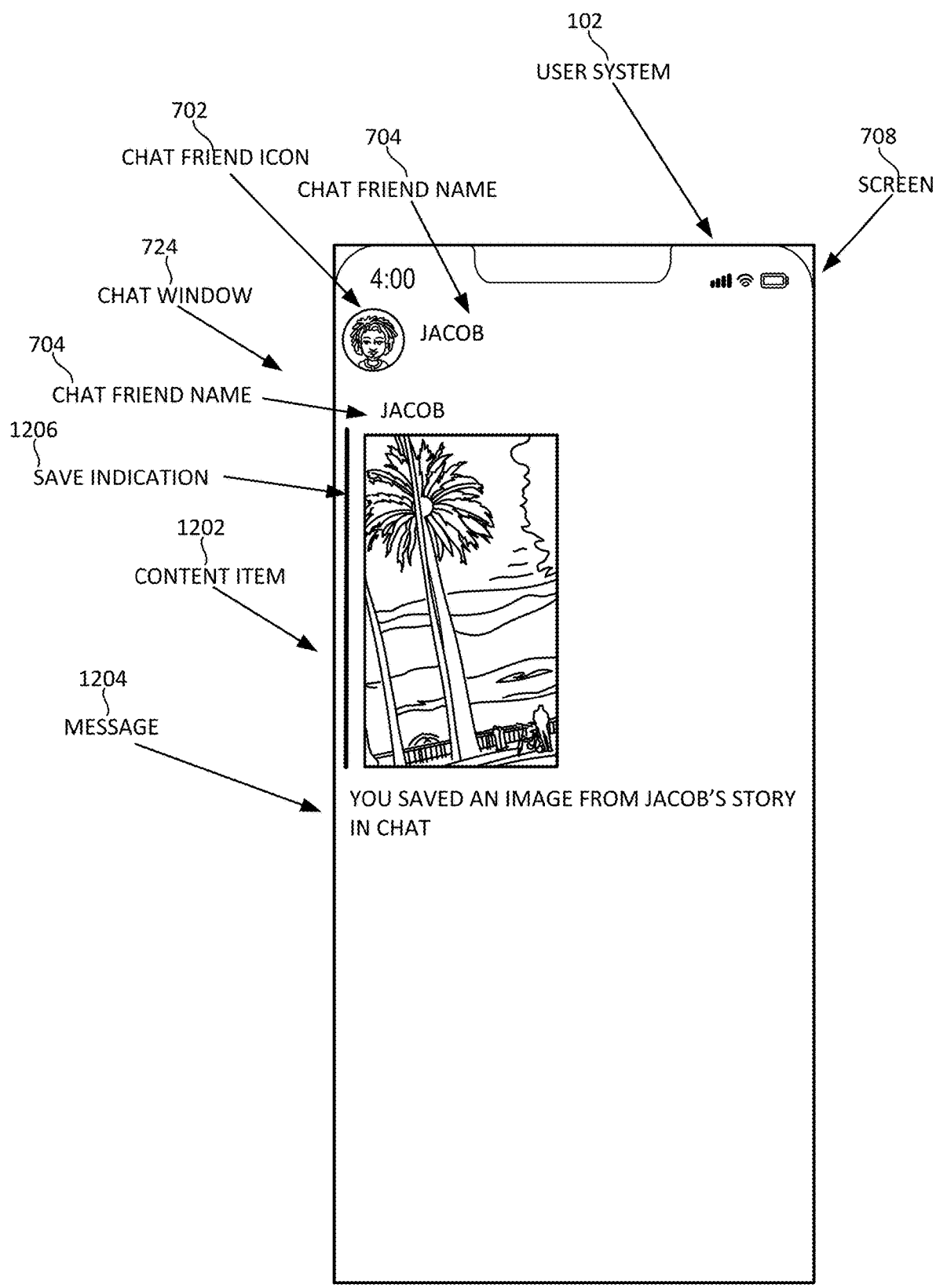
FIG. 12 illustrates a chat window after a content item is saved in the chat, in accordance with some examples.

FIG. 12 illustrates a chat window 724 after a content item 661 is saved in the chat 646, in accordance with some examples. User 1 650 has just saved a content item 661 to the chat 646. For example, user 1 650 has selected "Save Image in Chat" from the UI icons 1102 of FIG. 11. The chat component 602 displays the content item 1202, a save indication 1206 as well as a message 1204, which here is "You saved an image from Jacob's story in chat."

Similarly, if a story 642 had been saved, the chat component 602 would display the save indication 1206 and message 1204, which would be "You saved a Story from Jacob's story in Chat."

Figure 13:
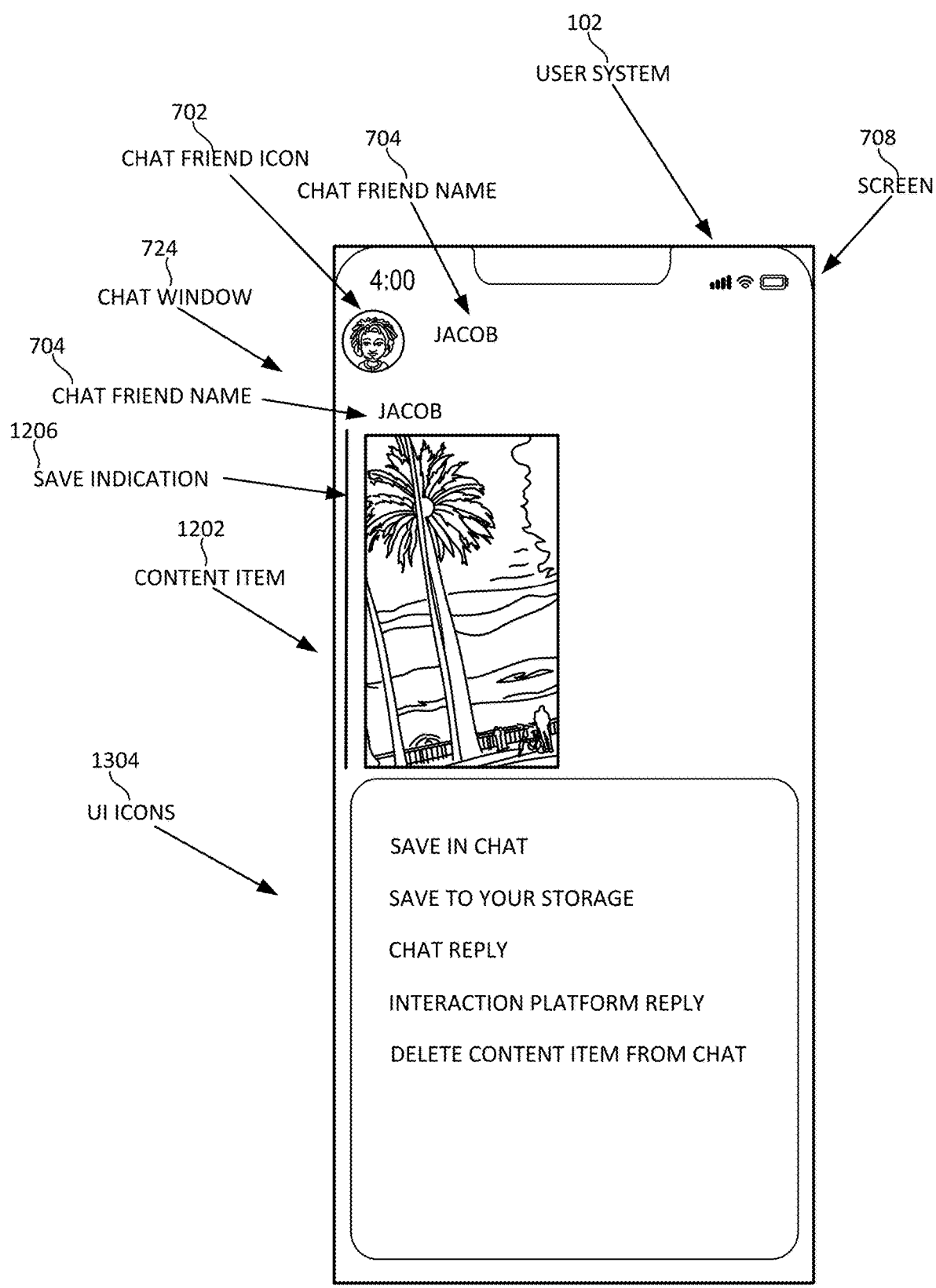
FIG. 13 illustrates a chat window after a content item that was saved in the chat 646 is selected, in accordance with some examples.

FIG. 13 illustrates a chat window 724 after a content item 661 that was saved in the chat 646 is selected, in accordance with some examples. In some examples, FIG. 13 illustrates the changes to FIG. 12 if user 1 650 selects the content item 1202 by, for example, a long press. The UI icons 1304 are displayed, which offer user 1 650 actions to perform. User 1 650 can delete the content item 1202 saved by user 2 652, "Jacob." User 1 650 can "save to your storage," which would save the content item 1202 to personal storage 671. User 1 650 can "chat reply," which would enable user 1 650 to reply to the content item 1202. User 1 650 can "interaction platform reply," which is a reply within the interaction platform 222 and may be an ephemeral message outside the chat 646. User 1 650 can "delete content item from chat," which will delete the content item 1202 from within the chat 646, delete the content item 1202 from the media cache 665 of the chat 646, and delete the content item 1202 from the friendship profile 625. If user 1 650 deletes the story 612 from their personal storage 671, which may be termed a "camera roll", then the story 642 and all associated content items 661 are deleted from the chat 646 even if they are saved, in accordance with some embodiments. Either user 1 650 or user 2 652 can delete the saved content item 1202 of a story 642. In some examples, the other user is not notified of the deletion. For example, user 1 650 deletes the content item 1202, then a notification 657 is not sent to user 2 652.

Figure 14:
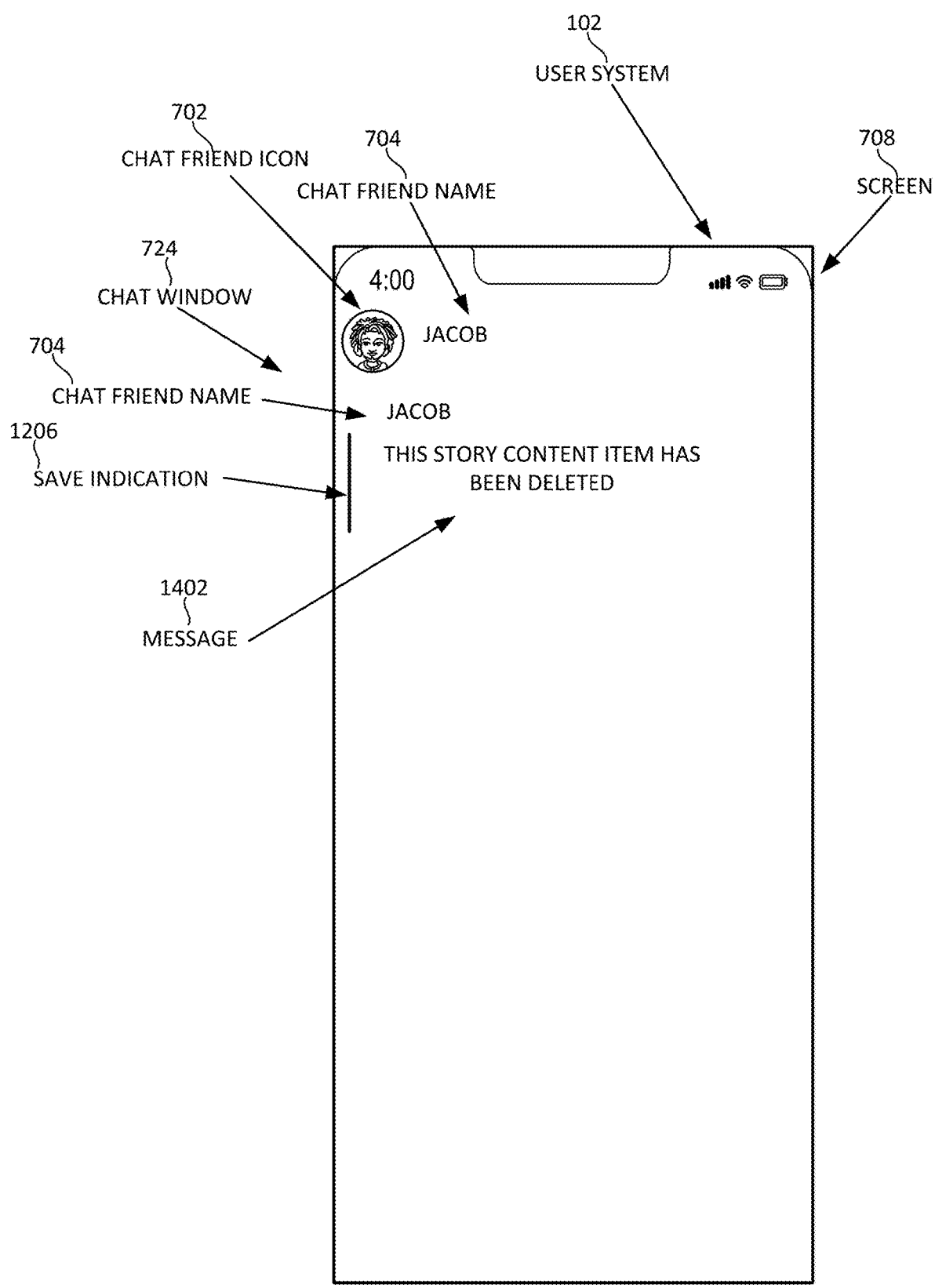
FIG. 14 illustrates a chat window after a content item is deleted from the chat, in accordance with some examples.

FIG. 14 illustrates a chat window 724 after a content item 661 is deleted from the chat 646, in accordance with some examples. The deleted content item 661 is replaced with a message 1402 such as "This story content item has been deleted." The message 1402 may be removed from the chat 646 based on the time limit 640 of the settings 653.

Figure 15:
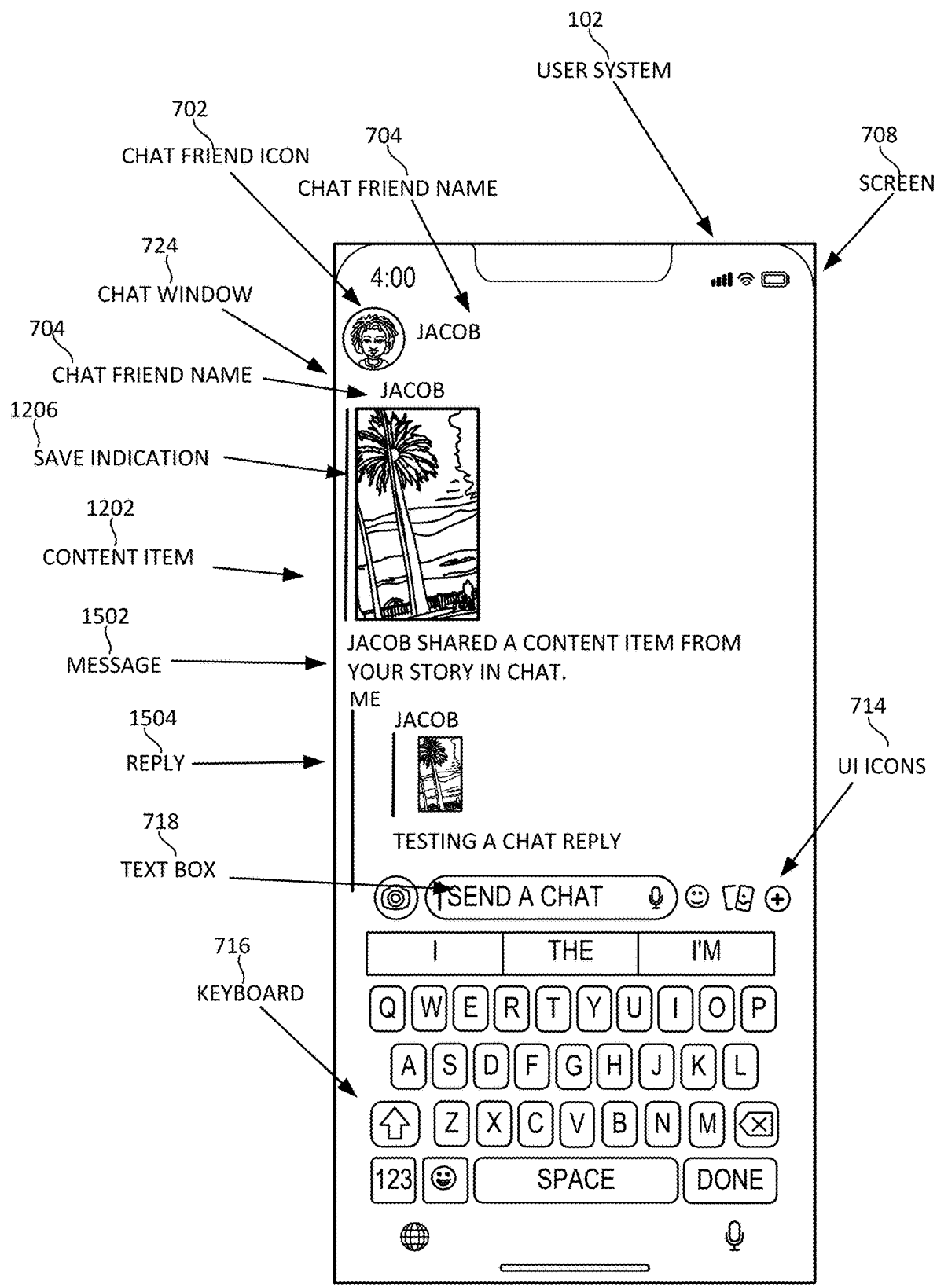
FIG. 15 illustrates a reply to a saved content item of a story in a chat, in accordance with some examples.

FIG. 15 illustrates a reply to a saved content item 661 of a story 642 in a chat 646, in accordance with some examples. Here, user 1 650 content item 1202 being shared in the chat 646 where the content item 661 is of a story 642 shared by user 1 650. A message 1502 for the content item 1202 is "Jacob shared a content item from your story in chat." User 1 650 selected the content item 1202, which brought up a menu and user 1 650 selected reply. User 1 650 then typed in a reply 1504 "testing a chat reply" using the keyboard 716. Similarly, user 1 650 can reply 1504 to a story 642 posted to the chat 646.

If user 1 650 or replier selects the reply 1504 such as with a long press then the chat component 602 presents a menu. The menu may have options such as "save in chat," "chat reply," "interaction platform reply," "copy," and "delete reply." In some examples, only the replier, which here is user 1 650, can delete their reply 1504. The chat component 602 displays in the chat window 724 a message such as "You deleted a chat" after the reply 1504 is deleted.

If the story 642 or content item 661 of the story 642 is deleted from the chat 646, then the reply 1504 is deleted as well. A deletion from the chat 646 includes being deleted from the chat 646, from the media cache 665 of the chat 646, and friendship profile 625. In some examples, when a reply 1504 is deleted, there is no notification 657 to user 2.

Figure 16:
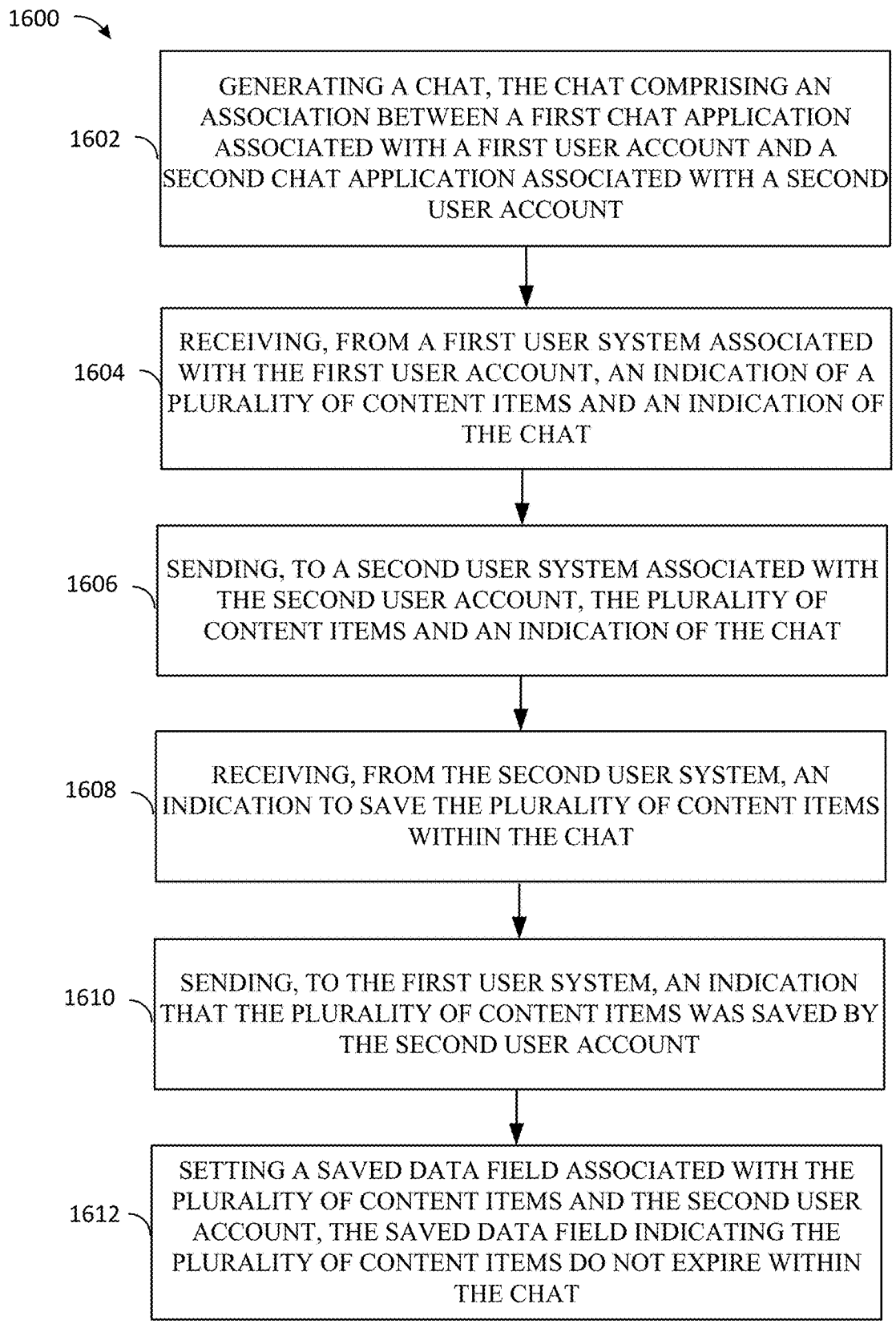
FIG. 16 illustrates a method for saving content items within a chat, in accordance with some examples.

FIG. 16 illustrates a method 1600 for saving content items within a chat, in accordance with some examples. The method 1600 begins at operation 1602 with generating a chat, the chat comprising an association between a first chat application associated with a first user account and a second chat application associated with a second user account. For example, referring to FIG. 6, the chat component 602 generates a chat 646 between user 1 650 and user 2 652. The method 1600 continues at operation 1604 with receiving, from a first user system associated with the first user account, an indication of a plurality of content items and an indication of the chat. For example, user 1 650 associated with a user system 102 and a user account 620 sends to the chat component 602 or the application 106 sends to the chat component 602 an indication of a story 612, which may be termed a plurality of content items 614.

The method 1600 continues at operation 1606 with sending, to a second user system associated with the second user account, the plurality of content items and an indication of the chat. For example, the chat component 602 sends to user 2 652 which is associated with a user system 102 and a user account 620 an indication of the story 642 within the chat 646.

The method 1600 continues at operation 1608 with receiving, from the second user system, an indication to save the plurality of content items within the chat. For example, the user 2 652 selects "Save in Chat" from the UI icons 802 of FIG. 8. The application 106 of the user system 102 of user 2 652 sends an indication to save the story 642 in the chat 646 to the chat component 602.

The method 1600 continues at operation 1610 with sending, to the first user system, an indication that the plurality of content items was saved by the second user account. For example, the chat component 602 sends to user 1 650 an indication that the story 642 within the chat 646 was saved by user 2 652. The method 1600 continues at operation 1612 with setting a saved data field associated with the plurality of content items and the second user account, the saved data field indicating the plurality of content items do not expire within the chat. For example, the chat component 602 sets saved 644 of the story 642 to indicate the story 644 is saved by user 2 652. The chat component 602 suspends the expiration of the story 642 within the chat 646 because the story 642 has been saved. The expiration indicates that the story 642 would normally be deleted from the chat 646 after a duration of time based on the time limit 640 of the settings 653.

The method 1600 optionally includes one or more additional operations, the operations of method 1600 can be performed in a different order, or one or more of the operations of the method 1600 can be optional. The method 1600 may be performed in whole or in part by one or more computing devices, or an apparatus of one or more computing devices disclosed herein. The functions of a component, such as the chat component 602, are performed or executed by one or more computing devices configured to perform or execute the functions of the component.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multiprocessor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" or "module" refers, for example, to a device, physical entity, or logic having boundaries defined by function or subroutine calls, branch points, APIs, or other technologies that provide for the partitioning or modularization of particular processing or control functions. Components or modules may be combined via their interfaces with other components to carry out a machine process. A component or module may be a packaged functional hardware unit designed for use with other components and a part of a program that usually performs a particular function of related functions. Components or modules may constitute either software components (e.g., code embodied on a machine-readable medium) or hardware components. A "hardware component" or "hardware module" is a tangible unit capable of performing certain operations and may be configured or arranged in a certain physical manner. In various examples, one or more computer systems (e.g., a standalone computer system, a client computer system, or a server computer system) or one or more hardware components or software components of a computer system (e.g., a processor or a group of processors) may be configured by software (e.g., an application or application portion) as a hardware component or software component that operates to perform certain operations as described herein. A hardware component or hardware module may also be implemented mechanically, electronically, or any suitable combination thereof. For example, a hardware component hardware module may include dedicated circuitry or logic that is permanently configured to perform certain operations. A hardware component or hardware module may be a special-purpose processor, such as a field-programmable gate array (FPGA) or an application-specific integrated circuit (ASIC). A hardware component or hardware module may also include programmable logic or circuitry that is temporarily configured by software to perform certain operations. For example, a hardware component or hardware module may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component or hardware module mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components or hardware modules can provide information to, and receive information from, other hardware components. Accordingly, the described hardware components or hardware modules may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component or hardware module may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems. Additional claimable subject matter further includes the following:

What is claimed is:

1. A computing device comprising:
   one or more processors; and
   one or more memories storing instructions that, when executed by the one or more processors, configure the one or more processors to perform operations comprising:
   generating a chat, the chat comprising an association between a first chat application associated with a first user account and a second chat application associated with a second user account;
   receiving, from a first user system associated with the first user account, an indication of a plurality of content items and an indication of the chat;
   sending, to a second user system associated with the second user account, the plurality of content items and an indication of the chat;
   receiving, from the second user system, an indication to save the plurality of content items within the chat;
   sending, to the first user system, an indication that the plurality of content items was saved by the second user account;
   setting a saved data field associated with the plurality of content items and the second user account, the saved data field indicating the plurality of content items do not expire within the chat;
   receiving, from the first user system associated with the first user account, an indication to delete the plurality of content items from a personal storage, outside the chat, associated with the first user account; and
   in response to receiving the indication to delete the plurality of content items from the personal storage, sending, to the first user system, an indication that the plurality of content items is deleted, and sending, to the second user system, an indication that the plurality of content items is deleted.

2. The computing device of claim 1, wherein the operations further comprise:
   receiving, from the second user system, an indication to unsave the plurality of content items within the chat; and
   setting the saved data field associated with the plurality of content items and the second user account to indicate a value of not saved, the value of not saved indicating the plurality of content items are to expire.

3. The computing device of claim 2, wherein the operations further comprise:
   determining the plurality of content items have expired within the chat; and
   sending to the first user system and the second user system an indication that the plurality of content items have expired within the chat.

4. The computing device of claim 3, wherein the determining the plurality of content items have expired within the chat further comprises:
   comparing a duration since the setting of the saved data field with a time limit set by the first user account.

5. The computing device of claim 1, wherein the operations further comprise:
   receiving, from the second user system associated with the second user account, an indication to delete the plurality of content items from the chat;
   sending, to the first user system, an indication that the plurality of content items is deleted; and
   sending, to the second user system, an indication that the plurality of content items is deleted.

6. The computing device of claim 1, wherein the saved data field is a second saved data field, and wherein the operations further comprise:
   receiving, from the first user system, an indication to save the plurality of content items within the chat; and
   setting a first saved data field associated with the plurality of content items and the first user account, the first saved data field indicating the plurality of content items do not expire within the chat.

7. The computing device of claim 6, wherein the operations further comprise:
   receiving, from the second user system, an indication to unsave the plurality of content items within the chat; and
   setting, to indicate a value of not saved, the second saved data field associated with the plurality of content items and the second user account, wherein the plurality of content items do not expire within the chat if the first saved field or the second saved field is set to saved.

8. The computing device of claim 1, wherein the operations further comprise:
   receiving, from the first user system associated with the first user account, an indication to delete the plurality of content items from a storage associated with the first user account;
   sending, to the first user system, an indication that the plurality of content items is deleted; and
   sending, to the second user system, an indication that the plurality of content items is deleted.

9. The computing device of claim 1, wherein the operations further comprise:
   determining the chat has two participants the first user account and the second user account; and
   determining the first user account is connected with the second user account within an interaction platform.

10. The computing device of claim 1, wherein a content item of the plurality of content items comprises an image, text, or a plurality of images.

11. The computing device of claim 1, wherein the operations further comprise:
    receiving, from the second user system, an indication to save a content item of the plurality of content items within the chat;
    sending, to the first user system, an indication that the content item was saved by the second user account; and
    setting a saved data field associated with the content item and the second user account, the saved data field indicating the content item does not expire within the chat.

12. A non-transitory computer-readable storage medium including instructions that, when processed by one or more processors, configure the one or more processors to perform operations comprising:
    generating a chat, the chat comprising an association between a first chat application associated with a first user account and a second chat application associated with a second user account;
    receiving, from a first user system associated with the first user account, an indication of a plurality of content items and an indication of the chat;
    sending, to a second user system associated with the second user account, the plurality of content items and an indication of the chat;

receiving, from the second user system, an indication to save the plurality of content items within the chat;

sending, to the first user system, an indication that the plurality of content items was saved by the second user account;

setting a saved data field associated with the plurality of content items and the second user account, the saved data field indicating the plurality of content items do not expire within the chat;

receiving, from the first user system associated with the first user account, an indication to delete the plurality of content items from a personal storage, outside the chat, associated with the first user account; and in response to receiving the indication to delete the plurality of content items from the personal storage, sending, to the first user system, an indication that the plurality of content items is deleted, and sending, to the second user system, an indication that the plurality of content items is deleted.

13. The non-transitory computer-readable storage medium of claim 12, wherein the operations further comprise:

receiving, from the second user system, an indication to unsave the plurality of content items within the chat; and setting the saved data field associated with the plurality of content items and the second user account to indicate a value of not saved, the value of not saved indicating the plurality of content items are to expire.

14. The non-transitory computer-readable storage medium of claim 13, wherein the operations further comprise:

determining the plurality of content items have expired within the chat; and sending to the first user system and the second user system an indication that the plurality of content items have expired within the chat.

15. The non-transitory computer-readable storage medium of claim 14, wherein the determining the plurality of content items have expired within the chat further comprises:

comparing a duration since the setting of the saved data field with a time limit set by the first user account.

16. The non-transitory computer-readable storage medium of claim 12, wherein the operations further comprise:

receiving, from the second user system associated with the second user account, an indication to delete the plurality of content items from the chat;

sending, to the first user system, an indication that the plurality of content items is deleted; and sending, to the second user system, an indication that the plurality of content items is deleted.

17. A method performed by one or more processors, the method comprising:

generating a chat, the chat comprising an association between a first chat application associated with a first user account and a second chat application associated with a second user account;

receiving, from a first user system associated with the first user account, an indication of a plurality of content items and an indication of the chat;

sending, to a second user system associated with the second user account, the plurality of content items and an indication of the chat;

receiving, from the second user system, an indication to save the plurality of content items within the chat;

sending, to the first user system, an indication that the plurality of content items was saved by the second user account;

setting a saved data field associated with the plurality of content items and the second user account, the saved data field indicating the plurality of content items do not expire within the chat;

receiving, from the first user system associated with the first user account, an indication to delete the plurality of content items from a personal storage, outside the chat, associated with the first user account; and in response to receiving the indication to delete the plurality of content items from the personal storage, sending, to the first user system, an indication that the plurality of content items is deleted, and sending, to the second user system, an indication that the plurality of content items is deleted.

18. The method of claim 17, further comprising:

receiving, from the second user system, an indication to unsave the plurality of content items within the chat; and setting the saved data field associated with the plurality of content items and the second user account to indicate a value of not saved, the value of not saved indicating the plurality of content items are to expire.

19. The method of claim 18, further comprising:

determining the plurality of content items have expired within the chat; and sending to the first user system and the second user system an indication that the plurality of content items have expired within the chat.

20. The method of claim 19, wherein the determining the plurality of content items have expired within the chat further comprises:

comparing a duration since the setting of the saved data field with a time limit set by the first user account.

* * * * *